(12) United States Patent
Shimamura

(10) Patent No.: US 7,996,151 B2
(45) Date of Patent: Aug. 9, 2011

(54) MAP INFORMATION DISPLAY CONTROLLING DEVICE, SYSTEM, METHOD, AND PROGRAM, AND RECORDING MEDIUM WHERE THE PROGRAM IS RECORDED

(75) Inventor: Tetsuro Shimamura, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/594,149

(22) PCT Filed: Mar. 25, 2005

(86) PCT No.: PCT/JP2005/005516
§ 371 (c)(1),
(2), (4) Date: Sep. 25, 2006

(87) PCT Pub. No.: WO2005/093689
PCT Pub. Date: Oct. 6, 2005

(65) Prior Publication Data
US 2007/0198181 A1    Aug. 23, 2007

(30) Foreign Application Priority Data
Mar. 29, 2004   (JP) ................................ 2004-096124

(51) Int. Cl.
*G01C 21/30* (2006.01)
*G06C 7/76* (2006.01)
*G01C 21/001* (2006.01)

(52) U.S. Cl. ........ 701/211; 701/117; 701/204; 701/207; 701/209; 701/210; 701/200; 701/218

(58) Field of Classification Search ................. 340/905, 340/929; 701/117, 209; 710/207
See application file for complete search history.

(56) References Cited

U.S. PATENT DOCUMENTS
4,350,970 A * 9/1982 von Tomkewitsch ......... 340/989
(Continued)

FOREIGN PATENT DOCUMENTS
EP    1063625 A1    12/2000
(Continued)

OTHER PUBLICATIONS
Japanese Office Action dated Mar. 23, 2010 (with its English translation).
(Continued)

*Primary Examiner* — Khoi Tran
*Assistant Examiner* — Ian Jen
(74) *Attorney, Agent, or Firm* — Kratz, Quintos & Hanson, LLP

(57) ABSTRACT

Provided is a navigation device which appropriately notifies a user of information. When traffic information and feature information are acquired, the traffic information and the feature information are associated with an ID number in accordance with time information and a type contained in the traffic information and the feature information to generate guidance having a single data structure. Calculated based on the time information of the guidance is an elapsed time up to a current time counted by a timer. Regarding the guidance having exceeded a predetermined time period, an icon A of such guidance is displayed in a display pattern different from the guidance not having exceeded the predetermined time period, where the icon A is displayed with higher transparency like an icon A1 or A2. Accordingly, the user can easily recognize the reliability of the traffic information and the feature information. The information is thus appropriately notified to the user.

3 Claims, 14 Drawing Sheets

U.S. PATENT DOCUMENTS

| | | | | |
|---|---|---|---|---|
| 5,369,588 | A * | 11/1994 | Hayami et al. | 340/995.19 |
| 5,428,544 | A * | 6/1995 | Shyu | 701/117 |
| 5,699,056 | A * | 12/1997 | Yoshida | 340/905 |
| 5,740,390 | A | 4/1998 | Pickover et al. | 395/348 |
| 6,091,956 | A * | 7/2000 | Hollenberg | 455/456.5 |
| 6,175,313 | B1 * | 1/2001 | Berezovsky | 340/929 |
| 6,185,503 | B1 * | 2/2001 | Sumizawa | 701/209 |
| 6,202,024 | B1 * | 3/2001 | Yokoyama et al. | 701/207 |
| 6,310,561 | B1 * | 10/2001 | Nomura et al. | 340/905 |
| 6,587,777 | B1 * | 7/2003 | St. Pierre | 701/117 |
| 6,721,650 | B2 * | 4/2004 | Fushiki et al. | 701/118 |
| 6,728,623 | B2 * | 4/2004 | Takenaga et al. | 701/96 |
| 6,812,888 | B2 * | 11/2004 | Drury et al. | 342/357.13 |
| 6,868,331 | B2 * | 3/2005 | Hanebrink | 701/117 |
| 7,054,713 | B2 * | 5/2006 | Teng et al. | 700/218 |
| 7,130,402 | B2 * | 10/2006 | Kawaguchi et al. | 379/196 |
| 7,246,007 | B2 * | 7/2007 | Ferman | 701/200 |
| 2001/0034575 | A1 * | 10/2001 | Takenaga et al. | 701/96 |
| 2002/0133291 | A1 * | 9/2002 | Hamada et al. | 701/208 |
| 2003/0011513 | A1 * | 1/2003 | Zhao et al. | 342/357.09 |
| 2003/0135383 | A1 * | 7/2003 | Mizuno | 705/1 |
| 2003/0152206 | A1 * | 8/2003 | Kawaguchi et al. | 379/201.01 |
| 2004/0034464 | A1 * | 2/2004 | Yoshikawa et al. | 701/117 |
| 2004/0128066 | A1 * | 7/2004 | Kudo et al. | 701/204 |
| 2004/0167710 | A1 * | 8/2004 | Fushiki et al. | 701/208 |
| 2004/0198386 | A1 * | 10/2004 | Dupray | 455/456.1 |
| 2004/0204845 | A1 * | 10/2004 | Wong | 701/210 |
| 2004/0225437 | A1 * | 11/2004 | Endo et al. | 701/209 |
| 2005/0053310 | A1 * | 3/2005 | Myochin | 382/284 |
| 2005/0071082 | A1 * | 3/2005 | Ohmura et al. | 701/211 |
| 2005/0190412 | A1 * | 9/2005 | Noguchi et al. | 358/474 |
| 2006/0064233 | A1 * | 3/2006 | Adachi et al. | 701/117 |
| 2006/0082472 | A1 * | 4/2006 | Adachi et al. | 340/995.13 |
| 2006/0122846 | A1 * | 6/2006 | Burr et al. | 705/1 |
| 2007/0061723 | A1 * | 3/2007 | Ohga et al. | 715/705 |

FOREIGN PATENT DOCUMENTS

| | | |
|---|---|---|
| JP | 63-282524 | 11/1988 |
| JP | 9-292834 | 11/1997 |
| JP | 2001-84073 | 3/2001 |
| JP | 2004-141473 | 5/2001 |
| JP | 2001-159532 | 6/2001 |
| JP | 2003-222528 | 8/2003 |
| JP | 2004-085286 | 3/2004 |

OTHER PUBLICATIONS

Japanese Office Action dated Jul. 20, 2010, along with English translation.
"Traffic and Traveller Information (TTI)—TTI Messages via Traffic Message Coding Part 1: Coding Protocol For Radio Data System—Traffic Message Channel (RDS-TMC) (RDS-TMC using Alert C) Version 3.0," British Standards Institution, vol. DD ENV 12313-1:1998, Jul. 1, 1998, XP-001247003, pp. 1-53.
Supplementary European Search Report dated May 3, 2010.

* cited by examiner

FIG. 4
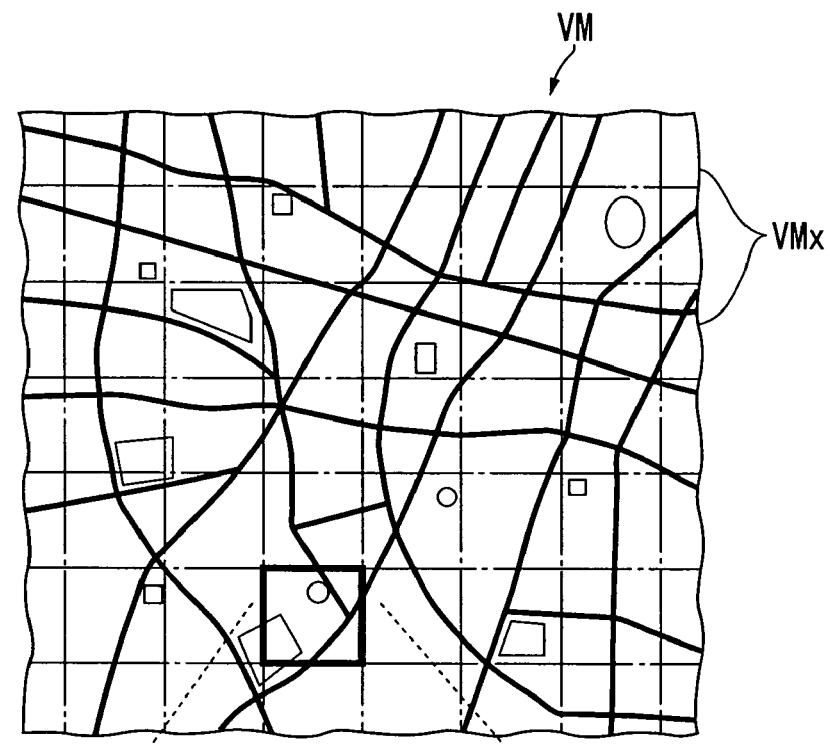
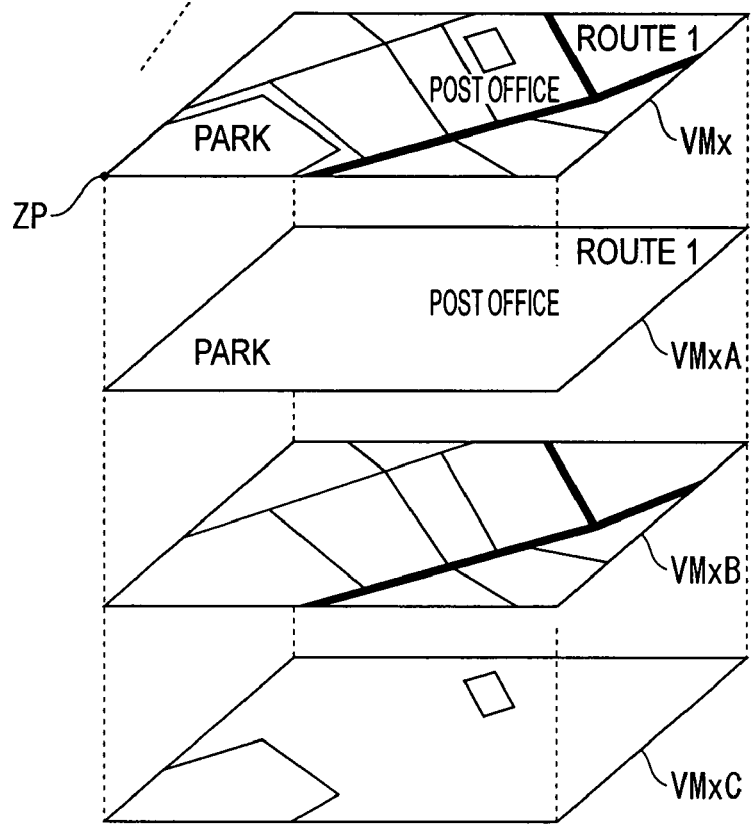

FIG. 6

| | | | | | | | | | | |
|---|---|---|---|---|---|---|---|---|---|---|
| ID 1 | POSITION INFORMATION OF TRAFFIC JAM INFORMATION 121A1 | TIME OF PROVIDING | INFORMATION REQUIRED FOR NAVIGATION | | | | | | | |
| ID 1 | POSITION INFORMATION OF TRAFFIC JAM INFORMATION 121A2 | TIME OF PROVIDING | INFORMATION REQUIRED FOR NAVIGATION | | | | | | | |
| ..... | ..... | ..... | ..... {121C} | | | | | | | |
| ID 1 | POSITION INFORMATION OF TRAFFIC JAM INFORMATION 121Am | TIME OF PROVIDING | INFORMATION REQUIRED FOR NAVIGATION | | | | | | | |
| ID 2 | POSITION INFORMATION | TIME OF PROVIDING | INFORMATION REQUIRED FOR NAVIGATION | | | | | | | |
| ID 3 | POSITION INFORMATION | TIME OF PROVIDING | ..... {122C} | | | | | | | |
| ..... | ..... | ..... | ..... | | | | | | | |
| ID 1 (162A1) | POSITION INFORMATION OF TRAFFIC JAM INFORMATION 121A1 | TIME OF PROVIDING | INFORMATION REQUIRED FOR NAVIGATION | | | | | | | |

162 — 162A (columns), TOTAL NUMBER: m

FIG. 7

<ID CONVERSION TABLE> 163

| ID | INFORMATION TYPE | PATTERN CHANGE OVER TIME | MARK TO BE DISPLAYED |
|---|---|---|---|
| 1 | PARKING AREA INFORMATION | INCREASING TRANSPARENCY | MARK A |
| 2 | SA/PA INFORMATION | INCREASING TRANSPARENCY | MARK B |
| 3 | TRAFFIC CONTROL INFORMATION | BLINKING SPEED | LINE |
| 4 | POINT PARTY INFORMATION | INCREASING TRANSPARENCY | MARK D |
| 5 | FACILITY INFORMATION | FLASHING | MARK E |
| 6 | TRAFFIC JAM INFORMATION | INCREASING TRANSPARENCY | LINE |
| ... | | | |

FIG. 11

| 162A1 | | 121C | 162A |
|---|---|---|---|
| ID 6 | LINK NUMBER OF TRAFFIC JAM 1 | TIME OF PROVIDING | INFORMATION REQUIRED FOR NAVIGATION (CONGESTION DEGREE OF TRAFFIC JAM, COORDINATES ETC.) |
| ID 6 | LINK NUMBER OF TRAFFIC JAM 2 | TIME OF PROVIDING | INFORMATION REQUIRED FOR NAVIGATION (CONGESTION DEGREE OF TRAFFIC JAM, COORDINATES ETC.) |
| ..... | ..... | ..... | ..... |
| ID 6 | POSITION INFORMATION OF INFORMATION m | TIME OF PROVIDING | INFORMATION REQUIRED FOR NAVIGATION (CONGESTION DEGREE OF TRAFFIC JAM, COORDINATES ETC.) |

TOTAL NUMBER: m

MAP INFORMATION DISPLAY CONTROLLING DEVICE, SYSTEM, METHOD, AND PROGRAM, AND RECORDING MEDIUM WHERE THE PROGRAM IS RECORDED

TECHNICAL FIELD

The present invention relates to a map information display control device that displays map information, a system thereof, a method thereof, a program thereof and a recording medium storing the program.

BACKGROUND ART

There has been known an in-vehicle navigation device that acquires traffic information (VICS data) on, for example, traffic accidents and traffic jams from a Vehicle Information Communication System (VICS) and superposes indications representing a traffic status including the traffic accidents and the traffic jams on map information displayed on a screen of a display device in order to notify a user of such information. There are demands for a navigation device that can provide assistance for better driving by utilizing the above-described arrangement.

DISCLOSURE OF THE INVENTION

Problems to be Solved by the Invention

Note that there often occurs a secondary traffic jam on roads in the vicinity of a precedent traffic jam due to avoidance of the precedent traffic jam. In the above-described arrangement in which the traffic information is acquired to be superposed on the map information in order to notify the user of the traffic status, the notified status only shows a status at a certain time point when the information was acquired, so that the notified traffic jam may have been resolved or the user may encounter the secondary traffic jam in trying to avoid the notified traffic jam in accordance with the notified traffic status.

In light of the above-described circumstances, an object of the present invention is to provide a map information display control device that appropriately notifies a user of information, a system thereof, a method thereof, a program thereof and a recording medium storing the program.

Means for Solving the Problems

A map information display controlling device according to an aspect of the invention includes: a map information acquirer which acquires map information; an information acquirer which acquires map component information forming the map information with at least one of traffic information relating to a traffic status or feature information relating to a feature; a time information acquirer which acquires time information relating to a time when the map component information is acquired; a timer which counts an elapsed time up to a current time based on the time information; and a display controller which controls a display unit to display the map information and to superpose the map component information relating to the elapsed time having exceeded a predetermined time period on the map information in a display pattern with higher transparency than the map component information relating to the elapsed time not having exceeded the predetermined time period.

A map information display controlling device according to another aspect of the invention includes: a map information acquirer which acquires map information; an information acquirer which acquires: map component information forming the map information with at least one of traffic information relating to a traffic status or feature information relating to a feature; and information containing time information relating to a time when the map component information is generated; a timer which counts an elapsed time up to a current time based on the time information; and a display controller which controls a display unit to display the map information and to superpose the map component information of the information relating to the elapsed time having exceeded a predetermined time period on the map information in a display pattern with higher transparency than the map component information of the information relating to the elapsed time not having exceeded the predetermined time period.

A map information display control system according to an aspect of the invention includes: the above-described map information display control device; and a terminal unit which is connected to the map information display control device via a network in a data transmittable manner, the terminal unit including the display unit which displays the map information.

A map information display control system according to another aspect of the invention includes: a server having a storage and a distributing unit; and the above-described map information display control device. The storage stores map information. The distributing unit distributes: map component information forming the map information with at least one of traffic information relating to a traffic status or feature information relating to a feature; and time information relating to a time when the map component information is generated or distributed by an information distributor. The map information display control device is connected to the server via a network in a data transmittable manner and controls the display unit to display the map information and the map component information.

In a map information display control method according to an aspect of the invention, a computing unit controls a display unit to display map information. The computing unit acquires: map component information forming the map information with at least one of traffic information relating to a traffic status or feature information relating to a feature; and time information relating to a time when the map component information is acquired. The computing unit controls, on recognizing that the acquired time information has exceeded the predetermined time period, the display unit to superpose the map information corresponding to the time information on the map information in a display pattern with higher transparency than the map component information corresponding to the time information not having exceeded the predetermined time period.

In a map information display control method according to another aspect of the invention, a computing unit controls a display unit to display map information. The computing unit acquires: map component information forming the map information with at least one of traffic information relating to a traffic status or feature information relating to a feature; and time information relating to a time when the map component information is generated. The computing unit controls, on recognizing that the time information of the acquired information has exceeded the predetermined time period, the display unit to superpose the map component information of the acquired information on the map information in a display pattern with higher transparency than the map component information of the information including the time information not having exceeded the predetermined time period.

A map information display control program according to an aspect of the invention controls a computing unit to work as the above-described map information display control device or as the above-described map information display control system.

A map information display control program according to another aspect of the invention controls a computing unit to execute the above-described map information display control method.

In a recording medium storing a map information display control program according to an aspect of the invention, the above-described map information display control program is stored in a manner readable by the computing unit.

BRIEF DESCRIPTION OF DRAWINGS

FIG. 4 is a conceptual diagram schematically showing a table structure of display data of map information according to the aforesaid embodiment;

FIG. 6 is a conceptual diagram schematically showing a table structure of an information storage region of a storage according to the aforesaid embodiment;

FIG. 7 is a conceptual diagram schematically showing a table structure of a conversion table region of the storage according to the aforesaid embodiment;

FIG. 11 is a conceptual diagram showing a table structure resulting from a retrieval of guidance based on an ID number according to the aforesaid embodiment;

EXPLANATION OF CODES

Figure 1:
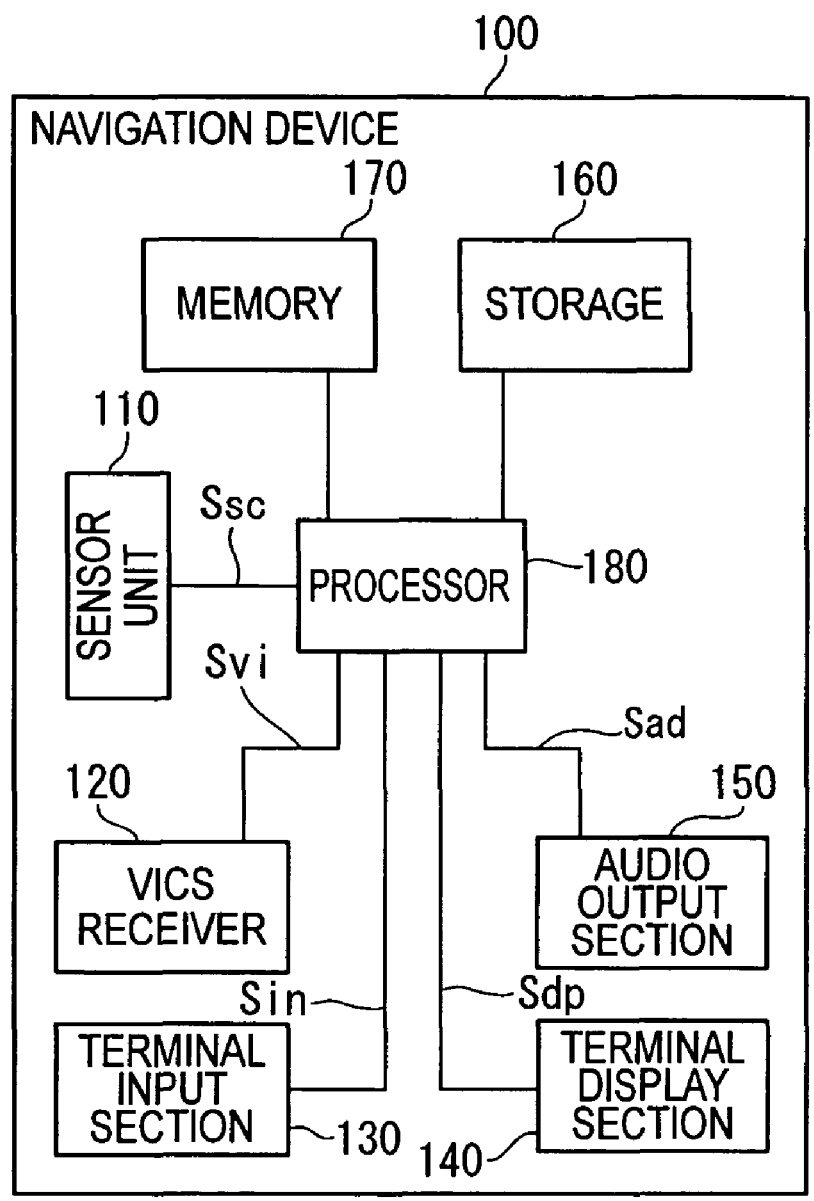
FIG. 1 is a block diagram schematically showing a structure of a navigation device according to an embodiment of the present invention.

100: navigation device as map information display control device
120: communication unit also workable as map information acquirer, information acquirer and time information acquirer
121: traffic information as map component information
121A1 to 121Am: traffic jam information as map component information
121C, 122C: time information
122: feature information as map component information
122A1 to 122Am: parking area information as map component information
140: terminal display section as display unit
161: map information storage region as map information storage
162: information storage region as information storage
162A1: ID number as identifying number
183: guidance generator working as information acquirer and time information acquirer
185: display controller
188: timer
189: elapsed time judging unit also workable as timer
190: updating status recognizer
A, A1, A2: icons as map component information

BEST MODE FOR CARRYING OUT THE INVENTION

An embodiment of the present invention will be described below with reference to the attached drawings. In the embodiment, as a map information display control device of the invention, a navigation device (a traffic status notifying device) that navigates a travel status of a mobile body (for example, a driving of a vehicle) will be described. However, the invention is not limited to the arrangement for navigating the driving, but may be applied to any arrangement for displaying a map. The navigation device is not limited to the arrangement for navigating the driving of the vehicle, but may be applied to any arrangement for notifying the traffic status of any type of mobile bodies.

[Structure of Navigation Device]

FIG. 1 shows a navigation device 100 that notifies a user of guidance on traveling in response to the travel status of the mobile body (for example, the vehicle). Note that the mobile body is not limited to a vehicle, but may be an aircraft or a ship. The navigation device 100 may be an in-vehicle type installed in a vehicle as a mobile body, a portable type, a PDA (Personal Digital Assistant), a mobile phone, a PHS (Personal Handyphone System) or a portable personal computer.

The navigation device 100 uses its map information to display information on a current position and a destination, retrieve and display a route to the destination, retrieve and display a predetermined shop nearby, and display information on service of the shop. To conduct these functions, as shown in FIG. 1, the navigation device 100 includes a sensor unit 110, a communication unit 120 (also workable as a map information acquirer, an information acquirer and a time information acquirer), a terminal input section 130, a terminal display section 140 (a display unit), an audio output section 150, a storage 160, a memory 170 and a processor 180.

The sensor unit 110 detects a status of a traveling of the mobile body (the vehicle), that is, the current position and a driving status to output a signal Ssc to the processor 180. The sensor unit 110 includes a GPS (Global Positioning System) receiver (not shown) and various sensors such as a speed sensor, an azimuth sensor and an acceleration sensor (each not shown).

The GPS receiver receives electric navigation waves output from a GPS satellite (an artificial satellite, not shown) via a GPS antenna (not shown). Then, the GPS receiver computes assumed coordinate values of the current position based on a signal corresponding to the received electric navigation waves and outputs the assumed coordinate values as GPS data to the processor 180.

The speed sensor of the sensor unit 110 is arranged on the mobile body (the vehicle) so as to detect a driving speed and an actual acceleration of the vehicle based on a signal that varies depending on the driving speed (travel speed) of the vehicle. The speed sensor reads a pulse signal, a voltage value and the like which are output in response to revolution of axles and wheels of the vehicle. Then, the speed sensor outputs detection information such as the read pulse signal and voltage value to the processor 180. The azimuth sensor is arranged on the vehicle and provided with a so-called gyrosensor (not shown) so as to detect the azimuth of the vehicle, that is, a driving direction in which the vehicle is moving forward. The azimuth sensor outputs a signal of detection information on the detected driving direction to the processor 180. The acceleration sensor is arranged on the vehicle so as to detect the acceleration in the driving direction of the vehicle. The acceleration sensor converts the detected acceleration into a sensor output value that is detection information such as a pulse and a voltage, and then outputs the sensor output value to the processor 180.

The communication unit 120 includes a communication antenna (not shown), with which the communication unit 120 acquires traffic information on the traffic status (map component information) and feature information on features (also map component information). Specifically, the communication unit 120 acquires the traffic information and the feature information (that form the map component information) and various kinds of information (that do not form a map) by way of, for example, a beacon, the FM multiplex broadcasting, phone lines and the Internet. Then, the communication unit 120 outputs the acquired map component information and the various kinds of information to the processor 180 as a predetermined signal Svi. Note that the traffic information may be data on, for example, traffic jams, traffic accidents, construction works and traffic controls which are associated with position information on the map, the data being sent from, for example, the VICS (Vehicle Information Communication System). The feature information is data on, for example, availability of a parking area, a menu of a restaurant and an open/close time of an amusement park which are associated with position information on the map, the data being sent with the VICS data, sent from facilities directly, or sent firstly to a predetermined server and then sent therefrom.

Figure 2:
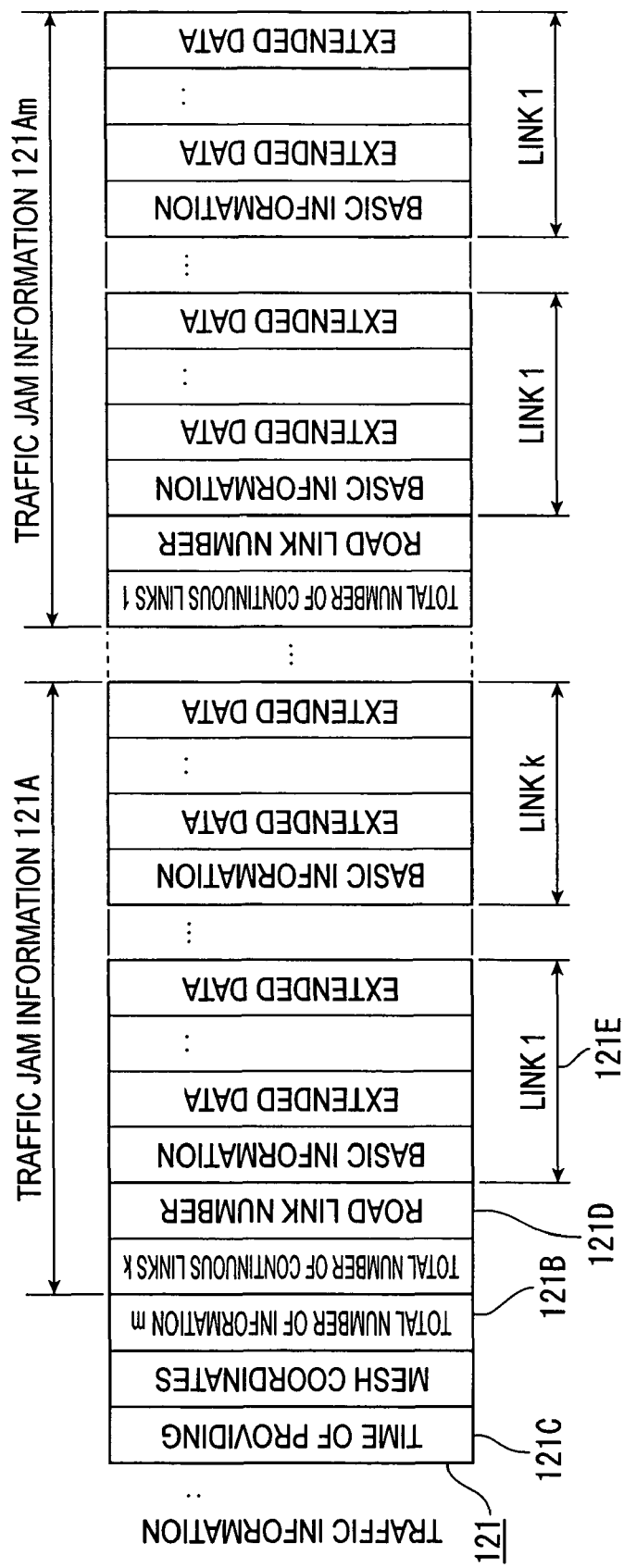
FIG. 2 is a conceptual diagram schematically showing a data structure of traffic information relating to a traffic jam according to the aforesaid embodiment.

For example, as shown in FIG. 2, traffic information 121 on traffic jams has a table structure containing a plurality of items as a single data. Specifically, formed as the single data are plural pieces of traffic jam information 121A1 to 121Am (m is a natural number) on traffic jams that exist at a predetermined time point, total-number information 121B on the total number of the plural pieces of traffic jam information 121A1 to 121Am and time information 121C on a predetermined time point when information distribution is conducted by a distributor such as the VICS. Each of the plural pieces of traffic jam information 121A1 to 121Am includes: position information 121D that is link information representing roads on the map information (described later); and plural pieces of traffic jam status information 121E on, for example, a status of a traffic jam and a starting position of the traffic jam.

Figure 3:
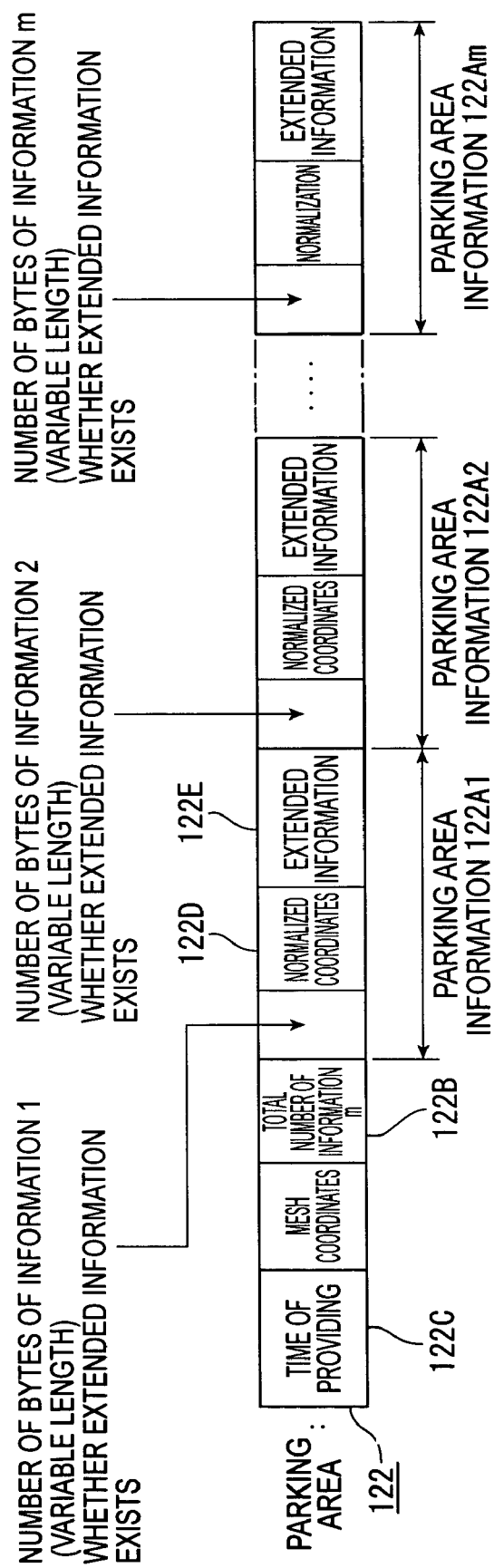
FIG. 3 is a conceptual diagram schematically showing a data structure of feature information relating to a parking area according to the aforesaid embodiment.

As shown in FIG. 3, the feature information 122 on parking areas has a table structure containing a plurality of items as a single data. Specifically, formed as the single data are plural pieces of parking area information 122A1 to 122Am (m is a natural number) on parking areas at a predetermined time, total-number information 122B on the total number of the plural pieces of parking area information 122A1 to 122Am and time information 122C on a predetermined time when the information distribution is conducted by the distributor such as the VICS. Each of the plural pieces of parking area information 122A1 to 122Am includes position information 122D on, for example, coordinates on the map information and plural pieces of parking area status information 122E each on, for example, the name, capacity and availability of a parking area.

The terminal input section 130, which may be a keyboard, a mouse or the like, has various operation buttons and operation knobs (each not shown) to be used for input operations. The operation buttons and the operation knobs are used to input, for example, settings for the operation of the navigation device 100. Specifically, the operation buttons and the operation knobs may be used: to set a type of information to be acquired and acquiring criteria; to set a destination; to retrieve information; and to display the driving status (travel status) of the vehicle and information on changes in display status. When the settings are input, the terminal input section 130 outputs a predetermined signal Sin to the processor 180 so as to apply the settings. In place of this input operation using the operation buttons and the operation knobs, the terminal input section 130 may employ an input operation using a touch panel arranged on the terminal display section 140, an audio input operation and the like for inputting various settings.

The terminal display section 140 is controlled by the processor 180 and displays on a screen a signal Sdp representing an image data sent from the processor 180. The image data may be image data of the map information and retrieval information, TV image data received by a TV receiver (not shown), image and video data stored in an external device or a recording medium such as an optical disc, a magnetic disc and a memory card and read by a drive or a driver, and image and video data from the memory 170. The terminal display section 140 may be a liquid-crystal display panel, an organic EL (Electro Luminescence) panel, a PDP (Plasma Display Panel), a CRT (Cathode-Ray Tube), a FED (Field Emission Display), or an electrophoretic display panel.

The audio output section 150 has a sound unit such as a speaker (not shown). The audio output section 150 is controlled by the processor 180 and outputs various signals Sad such as sound data from the processor 180 via the sound unit as audio. Information output as audio is on, for example, the driving direction and the driving status of the vehicle and the traffic status, such information being notified to occupants such as a driver of the vehicle in navigating the driving of the vehicle. The sound unit may appropriately output TV audio data received by the TV receiver and sound data stored in a recording medium or the memory 170. The audio output section 150 is not limited to the arrangement in which the sound unit is provided, but may be an arrangement in which a sound unit of the vehicle is used.

The storage 160 stores various kinds of information in a readable manner. The storage 160 includes a map information storage region 161 (a map information storage) which stores the map information shown in FIGS. 4 and 5, an information storage region 162 (an information storage) shown in FIG. 6, a conversion table region 163 shown in FIG. 7 and an icon data region (not shown). Note that although the storage 160 having these four regions is exemplified herein, the arrangement is not limited thereto and each region may be provided as a separate database or the storage 160 may include an additional region. The storage 160 may be a drive or a driver which readably stores data in various kinds of recording media such as a magnetic disc including a HD (Hard Disk), an optical disc including a DVD (Digital Versatile Disc) and a memory card.

Figure 5:
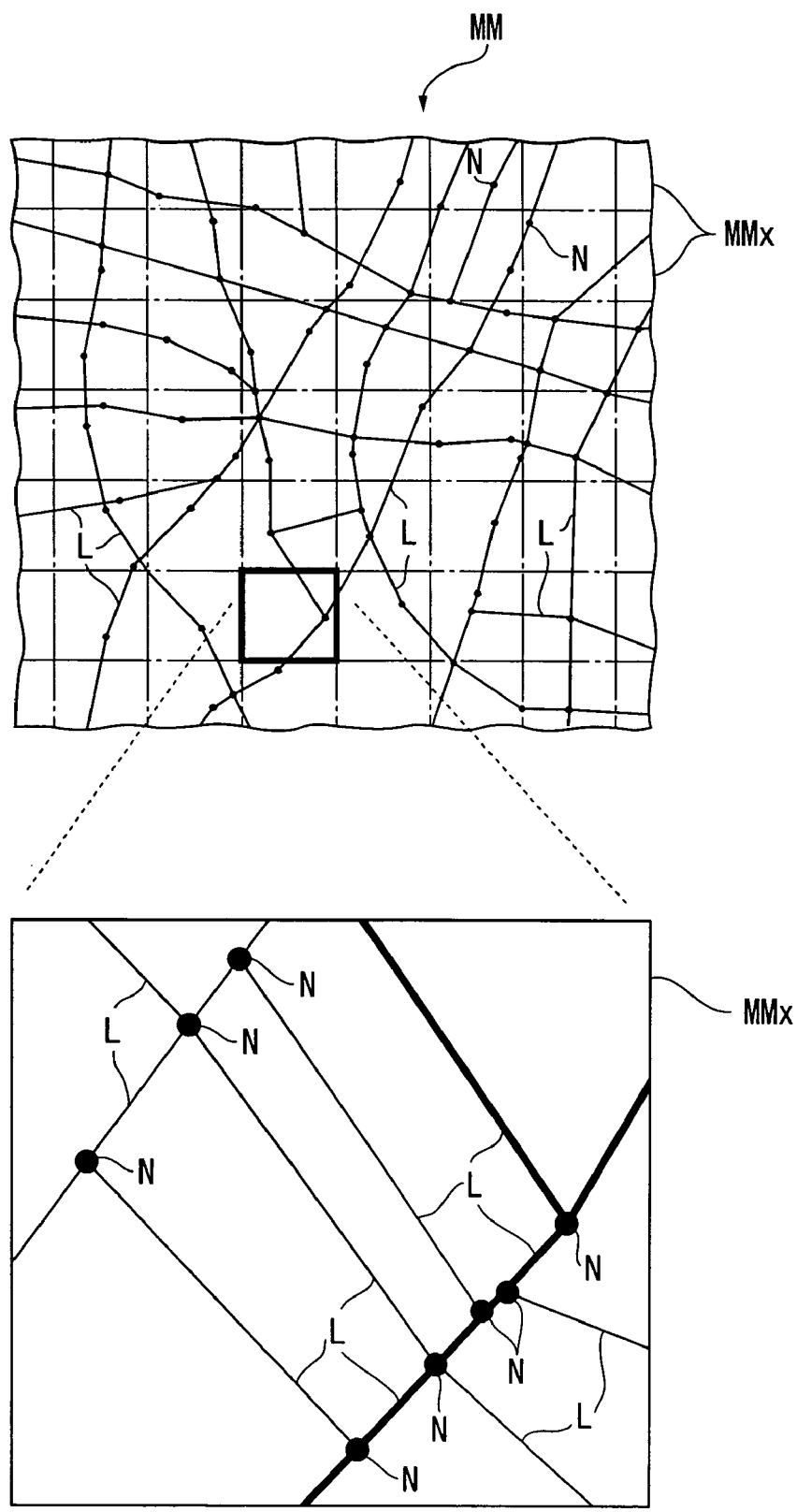
FIG. 5 is a conceptual diagram schematically showing a table structure of matching data of the map information according to the aforesaid embodiment.

The map information includes display data VM that is so-called POI (Point Of Internet) data shown in FIG. 4, matching data MM shown in FIG. 5 and travel route retrieval map data (not shown).

The display data VM is divided into plural pieces of display mesh information VMx, each piece of display mesh information VMx relating to a region and being continuously arranged in a matrix form with a unique number. The display mesh information VMx has a data structure in which following types of information are hierarchically layered: name information VMxA including data pieces in a table structure for displaying a name of an intersection, a name of an area or the like at a predetermined position; road information VMxB including data pieces in a table structure for displaying a road (road element data) at a predetermined position; and background information VMxC including data pieces in a table structure for displaying a mark and image information which represent famous spots and buildings at predetermined positions.

The matching data MM, like the display data VM, is divided into plural pieces of matching mesh information MMx, each piece of matching mesh information MMx relating to a region and being continuously arranged in a matrix form with a unique number. Note that the matching mesh information MMx may be divided into regions having a different size from that of the display mesh information VMx. In other words, the division scale may be different from that of the display mesh information VMx. The matching data MM includes plural pieces of link string block information. As shown in FIG. 5, the link string block information has a table structure in which a plurality of links L are associated in accordance with a predetermined rule, the link L is a line connecting nodes N (point information) that represent a joint point such as an intersection point, a corner, a fork, a junction or the like of a road. The link string block information is associated with information on a structure of the road including the number of lanes, whether the road is a main line or not, whether the road is a national road or a prefectural road and whether the road is a toll road in order to display the road on the map in relation with the display data VM.

Travel route retrieval map information has the same table structure as that of the matching data MM, in which point information representing points (like the nodes N of the road) and line information on lines that connect the points (like the links L). The travel route retrieval map information has an information structure for displaying the roads for a retrieval of the travel route.

As shown in FIG. 6, the information storage region 162 of the storage 160 has a table structure in which the map component information such as the traffic information 121 and the feature information 122 that are received by the communication unit 120 is stored as individual plural pieces of guidance 162A. More specifically, the feature information 122 relating to a parking area (FIG. 3) is stored as a single piece of guidance 162A in which each of the plural pieces of parking area information 122A1 to 122Am is associated with the time information 122C and the ID (identification) number 162A1 and the traffic information relating to a traffic jam (FIG. 2) is stored as a single piece of guidance 162A in which each of the plural pieces of traffic jam information 121A1 to 121Am is associated with the time information 121C and the ID number 162A1. Thus, the plural pieces of information are stored in the information storage region 162. The ID number 162A1 is a unique number assigned to an information type of the traffic information 121 and the feature information 122 to represent the category of the guidance.

As shown in FIG. 7, the converting table region 163 of the storage 160 has a table structure in which the ID number 162A1, icon information 163A1 for identifying an icon to be superposed on the map information to represent the traffic information 121 or the feature information 122, change condition information 163A2 relating to a change rule for changing how to display the icon along the elapse of time are associated to each other as a single record to be stored as conversion data 163A. Thus, plural pieces of conversion data 163A are stored in the converting table region 163. The icon information 163A1 is associated with the image data of the icon to be superposed on the map information stored in the icon data region. The icon information 163A1 relates to a unique number for identifying the image data. The change condition information 163A2 relating to the change rule is information for identifying a calculation routine (not shown) provided in the storage 160. In FIG. 7, the content of the calculation routine is shown as the change condition information 163A2 and an information type explaining details of a type is also shown for convenience of description. The calculation routine is a process for changing how to display the image data of the icon on the terminal display section 140. More specifically, the following processes can be exemplified: a process for changing transparency, a process for changing an interval of blinking in displaying, a process for changing display resolution of image data, a process for changing a size of mosaic patterns, a process for changing a light amount of flash display, a process for changing the width of an outline, a process for changing the size of a displayed icon, a process for increasing and decreasing the number of dots of the image data, a process for changing stereoscopic extent of stereoscopic display, a process for changing illustrations, and a process for superposing text information relating to the elapse of time and the status.

The storage 160 stores the retrieval information for, for example, acquiring information of a predetermined point in the map information. More specifically, the retrieval information includes various kinds of information such as names of prefectures, cities, towns, districts and points and guidance; and information on shops as points, such information is in a tree table structure in which item information is stored hierarchically. In response to a retrieval request for retrieval information input via, for example, the terminal input section 130, a retrieval of a shop or a facility is hierarchically conducted based on the item information in order to display the retrieved information on the screen or to output as an audio.

The memory 170 readably stores the settings input via the terminal input section 130, music data and image data, the guidance 162A stored in the information storage region 162 (FIG. 6) and the like. The memory 170 also stores various programs that run on the OS (Operating System) controlling the whole operation of the navigation device 100. The memory 170 may be preferably a memory such as a CMOS (Complementary Metal-Oxide Semiconductor) memory, of which storage can be retained even if the power is suddenly shut down due to, for instance, a blackout. The memory 170 may include a drive or a driver for readably storing the data in a recording medium such as a HD, a DVD and an optical disc.

Figure 8:
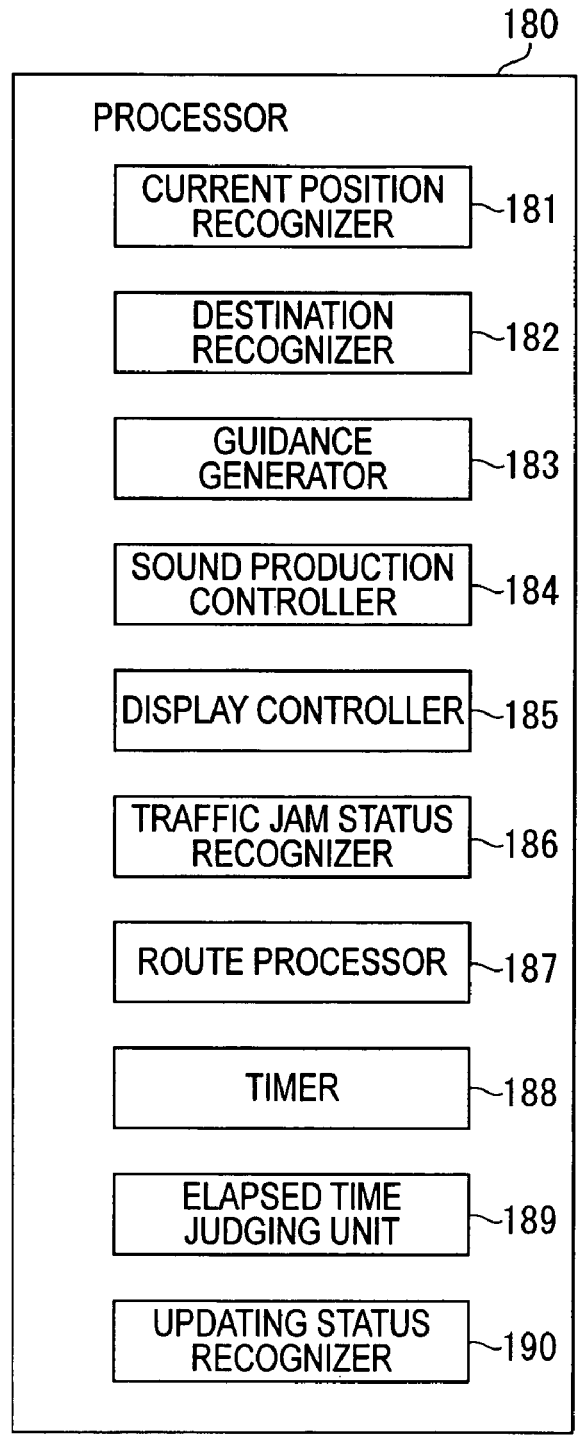
FIG. 8 is a block diagram schematically showing a structure of a processor of the navigation device according to the aforesaid embodiment.

The processor 180 includes various input/output ports (not shown) such as a GPS receiving port connected to the GPS receiver of the sensor unit 110, sensor ports connected to the sensors of the sensor unit 110, a communication port connected to the communication unit 120, a key input port connected to the terminal input section 130, a display control port connected to the terminal display section 140, an audio control port connected to the audio output section 150, a storage port connected to the storage 160 and a memory port connected to the memory 170. As shown in FIG. 8, the processor 180 has various programs such as a current position recognizer 181, a destination recognizer 182, a guidance generator 183 functioning as the information acquirer and the time information acquirer, a sound production controller 184, a display controller 185, a traffic jam status recognizer 186, a route processor 187, a timer 188, an elapsed time judging unit 189 also functioning as the timer, an updating status recognizer 190 and the like.

The current position recognizer 181 recognizes the current position of the vehicle. Specifically, the current position recognizer 181 calculates a plurality of current assumed positions of the vehicle based on the speed data and the azimuth data output respectively from the speed sensor and the azimuth sensor of the sensor section 110. In addition, the current position recognizer 181 recognizes the current assumed coordinate values of the vehicle based on the GPS data on the current position output from the GPS receiver. Then, the current position recognizer 181 compares the calculated current assumed positions with the recognized current assumed coordinate values, and calculates the current position of the vehicle on the map information separately acquired so as to recognize the current position.

The current position recognizer 181 judges a slope angle and an altitude of the road on which the vehicle is driving based on the acceleration data output from the acceleration sensor and calculates the current assumed position of the vehicle so as to recognize the current position. Thus, the current position of the vehicle can be accurately recognized even if the vehicle is on an intersection with an overpass or on an elevated highway where roads are overlaid in a two-dimensional view. Furthermore, when the vehicle drives on a mountain road or a slope, the current position recognizer 181 corrects the discrepancy between the travel distance obtained only based on the speed data and the azimuth data and the actual driving distance by using the detected slope angle of the road to accurately recognize the current position.

The current position recognizer 181 can recognize not only the current position of the vehicle as described above but also a starting point, i.e. an initial point set by the terminal input section 130 as the current assumed position. Various information acquired by the current position recognizer 181 are appropriately stored in the memory 170.

The destination recognizer 182 acquires destination information on the destination set by the input operation via the terminal input section 130 and recognizes the position of the destination. The destination information to be set may include various kinds of information for identifying a spot such as coordinates of latitude and longitude, addresses, telephone numbers and the like. Such destination information recognized by the destination recognizer 182 is appropriately stored in the memory 170.

The guidance generator 183 acquires the map component information such as the traffic information 121 and the feature information 122 that are received by the communication unit 120 and generates the guidance 162A shown in FIG. 6. Specifically, the guidance generator 183 judges the type of the acquired map component information and sets the ID number. For example, as shown in the converting table region 163 in FIG. 7, the guidance generator 183 sets the ID number 162A1 to "1" when the feature information 122 relating to a parking area is stored, to "2" when the feature information 122 relating to a crowding status of a service area or a parking area is stored, to "3" when the traffic information 121 relating to the traffic controls is stored, to "4" when the feature information 122 relating to a crowding status of a facility is stored, and to "5" when the traffic information 121 relating to a traffic jam is stored.

The guidance generator 183 generates plural pieces of guidance 162A having the single data structure in which the plural pieces of traffic jam information 121A1 to 121Am and the plural pieces of parking area information 122A1 to 122Am (both forming the map component information) are individually associated with the ID number 162A1 and the time information 121C, 122C, when the map component information includes: the plural pieces of traffic information 121 and the plural pieces of feature information 122 like the traffic information 121 shown in FIG. 2 and the feature information 122 relating a parking area shown in FIG. 3; and the time information 121C, 122C. When the map component information only includes a single piece of traffic jam information 121A or a single piece of parking area information 122A1 together with the time information 121C, 122C, the guidance generator 183 generates a single piece of guidance 162A in which the map component information is associated with the ID number 162A1. When the map component information includes no time information 121C, 122C, the guidance generator 183 generates the guidance 162A having a single data structure in which the time counted by the timer 188 at a time point when the map component information is received by the communication unit 120 or at a time point the map component information is acquired by the guidance generator 183. Then, the guidance generator 183 outputs the generated guidance 162A to the storage 160 so as to store the generated guidance 162A in the information storage region 162.

The sound production controller 184 notifies guidance on the traveling of the vehicle based on travel route information and feature guidance that are stored in the memory 170 and acquired in response to the travel status of the vehicle. The sound production controller 184 notifies guidance for assisting the traveling of the vehicle as sounds output via the audio output section 150. For example, the feature information such as the traffic information including the traffic jam status and shop information may be provided by producing sounds like "You may turn right toward XX at intersection YY 700 meters ahead", "You are deviating from the travel route", "There may be a traffic jam ahead" or "There is XX on the right 100 meters ahead".

The display controller 185 controls various display screens for prompting the user to operate the terminal input section 130 to set various kinds of information. The display controller 185 also controls the terminal display section 140 to display the map information on the terminal display section 140.

Herein, the display controller 185 conducts a process exemplified below for displaying the map information on the terminal display section 140. Specifically, when the setting for superposing a predetermined guidance 162A on the map information is set by a predetermined input operation via the terminal input section 130, the display controller 185 recognizes the ID number 162A1 of the guidance 162A set to be superposed by the input operation and reads the guidance 162A having the ID number 162A1 from the information storage region 162 of the storage 160. In addition, based on the converting table region 163 of the storage 160, the display controller 185 acquires the icon information 163A1 associated with the recognized ID number 162A1 and acquires the image data of the corresponding icon from the icon data region of the storage 160. Then, based on the position information 121D, 122D of the read information, the display controller 185 superposes the read image data of the icon on the map information in order to appropriately display the map information with icons A (the map component information) superposed on the terminal display section 140.

Further, when the setting for superposing a self position (the current position of the vehicle) is set by a predetermined input operation via the terminal input section 130, the display controller 185 superposes an icon representing the self position on the map information. In this display control, the display controller 185 uses the matching data MM based on the current position information and the azimuth that are recognized by the current position recognizer 181 to appropriately change, that is, to correct the current position information so as not to be deviated from a road (an element forming the map to be displayed), thereby superposing the icon representing the self position on the map information.

Figure 9:
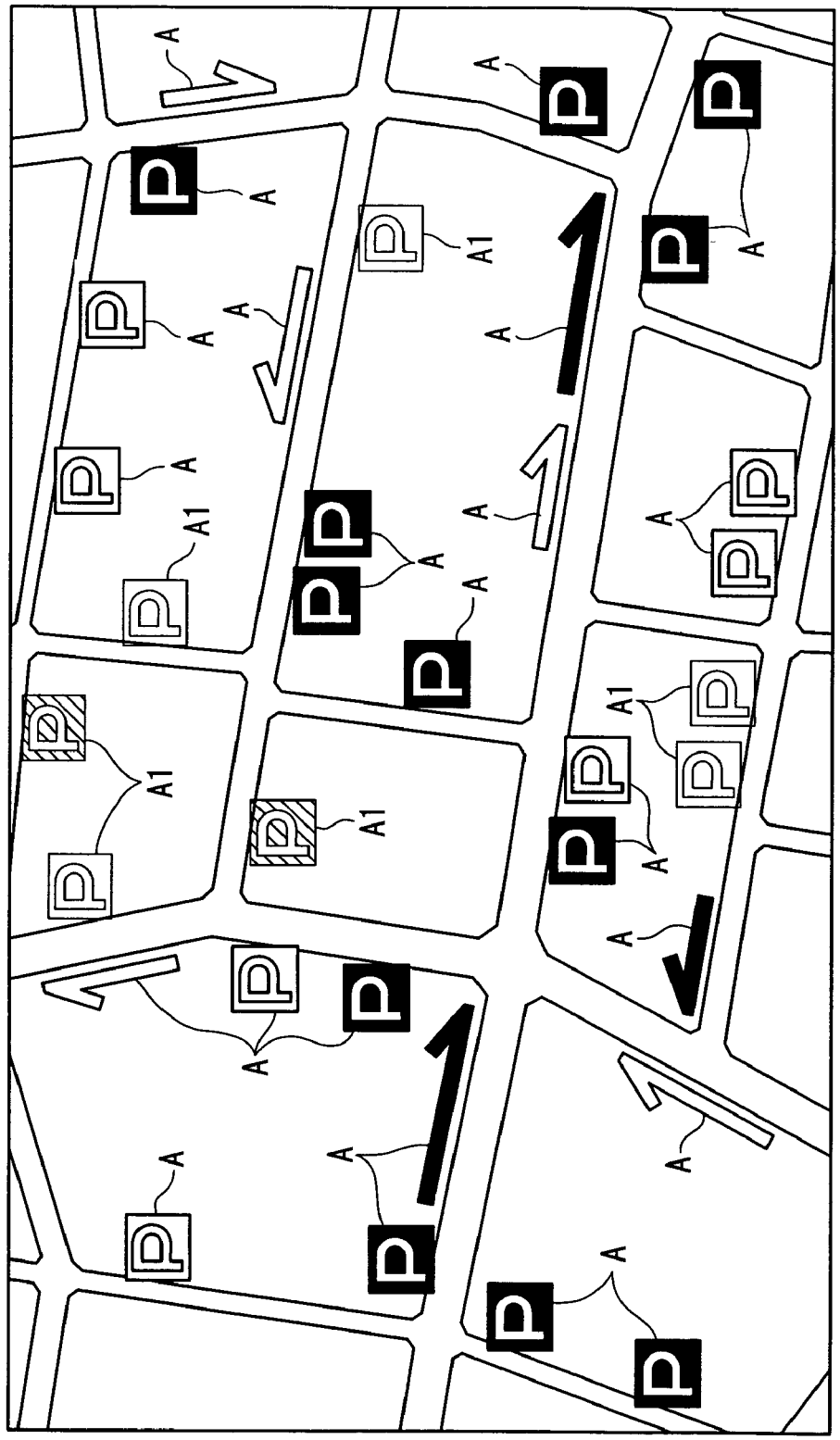
FIG. 9 is an illustration showing the map information in which icons are displayed in a superposing manner in different display patterns according to the aforesaid embodiment.
Figure 10:
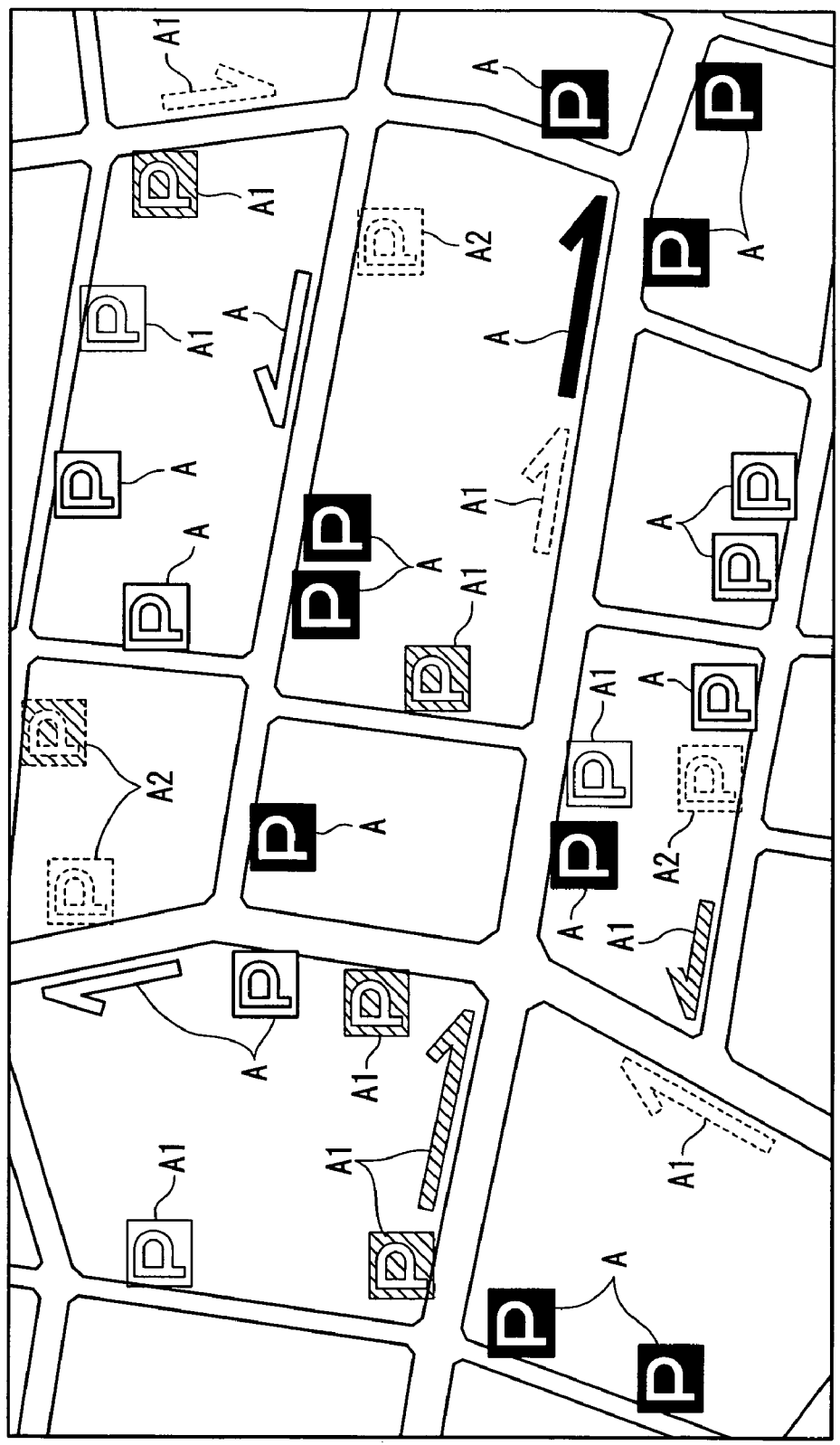
FIG. 10 is an illustration showing the map information in which the icons, which have exceeded a predetermined time from the state in FIG. 9, are displayed in the superposing manner in different display patterns according to the aforesaid embodiment.

The display controller 185 recognizes the change condition information 163A2 on the image data of the corresponding icon A using the signal from the elapsed time judging unit 189 based on the converting table region 163 in order to operate a calculation routine based on the change condition information 163A2. Then, the display controller conducts the process for displaying the image data in a display pattern in accordance with the elapse of time, that is, for displaying the image data while changing the display pattern based on the calculation routine as shown in FIGS. 9 and 10, for example. In the process for changing, the icon is controlled such that a difference in the display pattern becomes larger as the elapsed time becomes longer, that is, the transparency of the icon becomes higher in 30 minutes than in 10 minutes due to threshold values, thereby controlling the icon to be less visible to the user. FIG. 10 shows some exemplary icons A1, A2 of the icons A representing the traffic jam information 121A1 to 121Am and the parking area information 122A1 to 122Am are controlled to have a different transparency.

The display controller 185 recognizes updating change condition information on the image data of the corresponding icon A using a signal from the updating status recognizer 190 in order to operate a calculation routine based on the updating change condition information. The display controller 185 conducts an updating change display process for displaying in an updated manner the image data in a display pattern in accordance with the updating, that is, for displaying the image data, for example, with flashing. In the updating change display process, no updating is conducted when a predetermined period of time has been elapsed from the updating in a time-counting by the timer 188.

The traffic jam status recognizer 186 generates current traffic jam information relating to a status of a traffic jam that currently exists. Specifically, the traffic jam status recognizer 186 appropriately acquires the VICS data from the VICS output from the communication unit 120. Then, the traffic jam status recognizer 186 recognizes the traffic jam status based on the acquired VICS data and the traffic jam information 121A to 121Am of the traffic jam information relating to statuses of the traffic jams existing in an area including, for example, the current position and the destination or in a predetermined range around the current position. The traffic jam status recognizer 186 computes an expected arrival time that is a predicted time of the arrival at a predetermined place (the destination), the computation being made in consideration of the traffic jam status. More specifically, the time required to pass a traffic jam zone is firstly computed based on a congestion level and a distance of the traffic jam of the traffic jam information, and then the expected arrival time is computed using the computed time.

The route processor 187 computes and retrieves a travel route of the vehicle based on the settings for selecting the route which are set by the user and the map information stored in the storage 160. The route processor 187 can compute the travel route by recognizing a request for retrieving the route in consideration of the traffic jam information by the processor 180 and by using the traffic jam status recognized by the traffic jam status recognizer 186.

The timer 188 counts the current time based on a standard pulse such as an internal clock. Then, the timer 188 appropriately outputs time information on the recognized current time. The timer 188 counts an elapsed time from the time stored as the time information 121C, 122C of the guidance 162A based on the time information 121C, 122C of the guidance 162A stored in the information storage region 162 and the current time being counted. The timer 188 herein includes an own power source thereof such as an accumulator battery such that the current time can be counted even when the power is not supplied to the navigation device 100. However, the timer 188 is not limited to such arrangement. For example, the timer 188 may be a so-called wave clock that counts time by recognizing the current time by means of receiving radio waves through power supply.

The elapsed time judging unit 189 judges whether the elapsed time counted by the timer 188 exceeds a predetermined time period that is set in advance and recognizes the guidance 162A including the time information 121C, 122C which represents the time over the predetermined time. The elapsed time judging unit 189 recognizes the guidance 162A which has elapsed the predetermined time and outputs a signal for changing the display pattern of the guidance 162A to the display controller 185.

The updating status recognizer 190 recognizes the type and the position information of the map component information acquired by the communication unit 120. Then, the updating status recognizer 190 judges whether the plural pieces of guidance 162A already stored in the information storage region 162 contain a piece of information which has a corresponding ID number 162A1 to the recognized type or has the same position information 121D, 122D as the recognized position information 121D, 122D. In such a judgment, the updating status recognizer 190 may judge the ID number 162A1 corresponding to the recognized type and retrieve the guidance 162A having the judged ID number 162A1 in the information storage region 162 as shown in FIG. 11. The updating status recognizer 190 then compares the position information 121D, 122D of the retrieved guidance 162A with the position information 121D, 122D of the acquired map component information for uniformity. When the updating status recognizer 190 judges that corresponding map component information is already stored, the existing map component information is updated by the map component information acquired by the communication unit 120. Specifically, the existing guidance 162A is deleted and the guidance 162A associated with the ID number 162A1 and the time information 121C, 122C is alternatively stored from the acquired map component information. The updating status recognizer 190 outputs a signal indicating that the predetermined guidance 162A has been updated.

[Operation of Navigation Device]

The operation of the navigation system 100 will be described with reference to the attached drawings.

Figure 12:
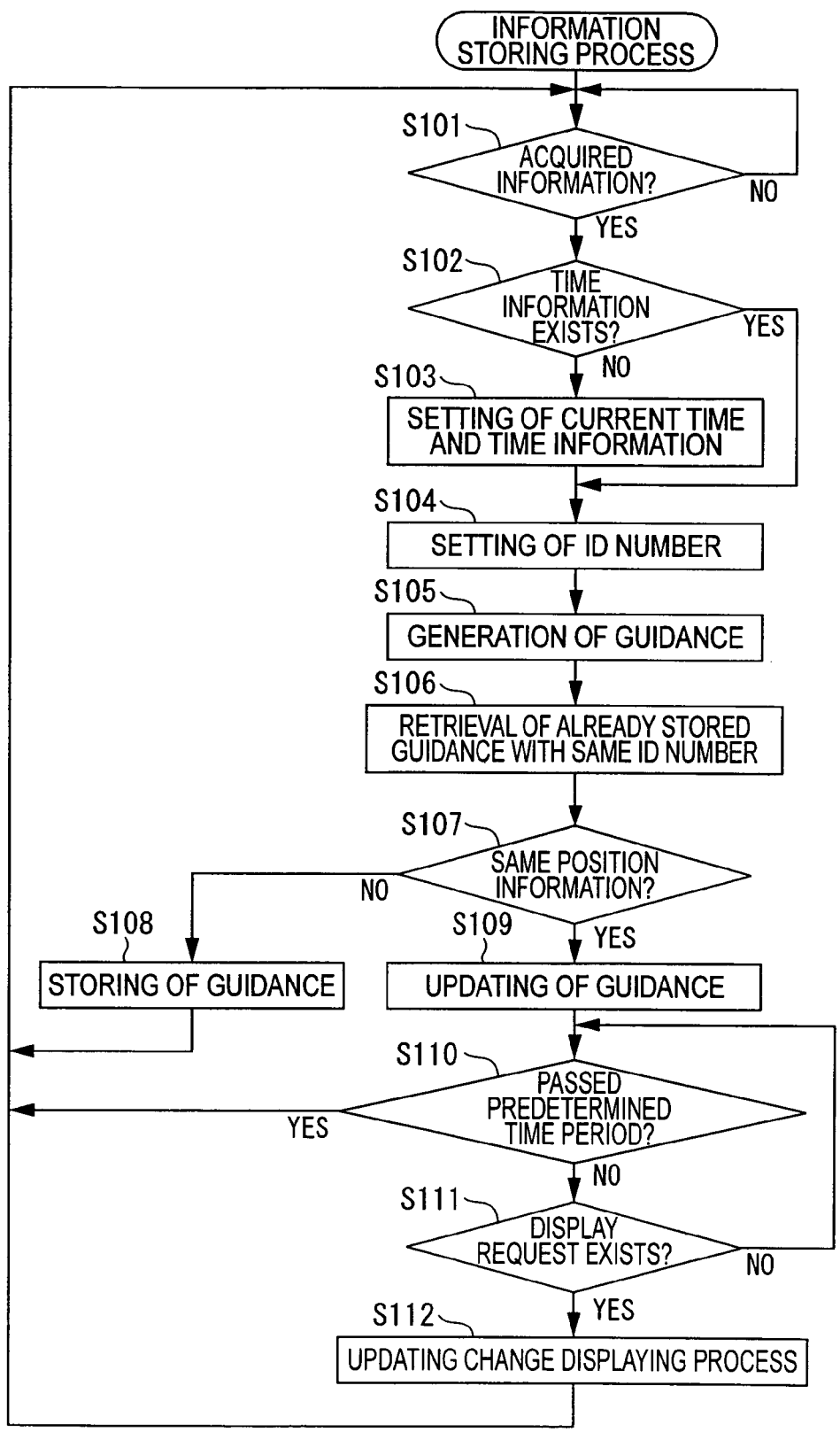
FIG. 12 is a flowchart showing an information storing process according to the aforesaid embodiment.
Figure 13:
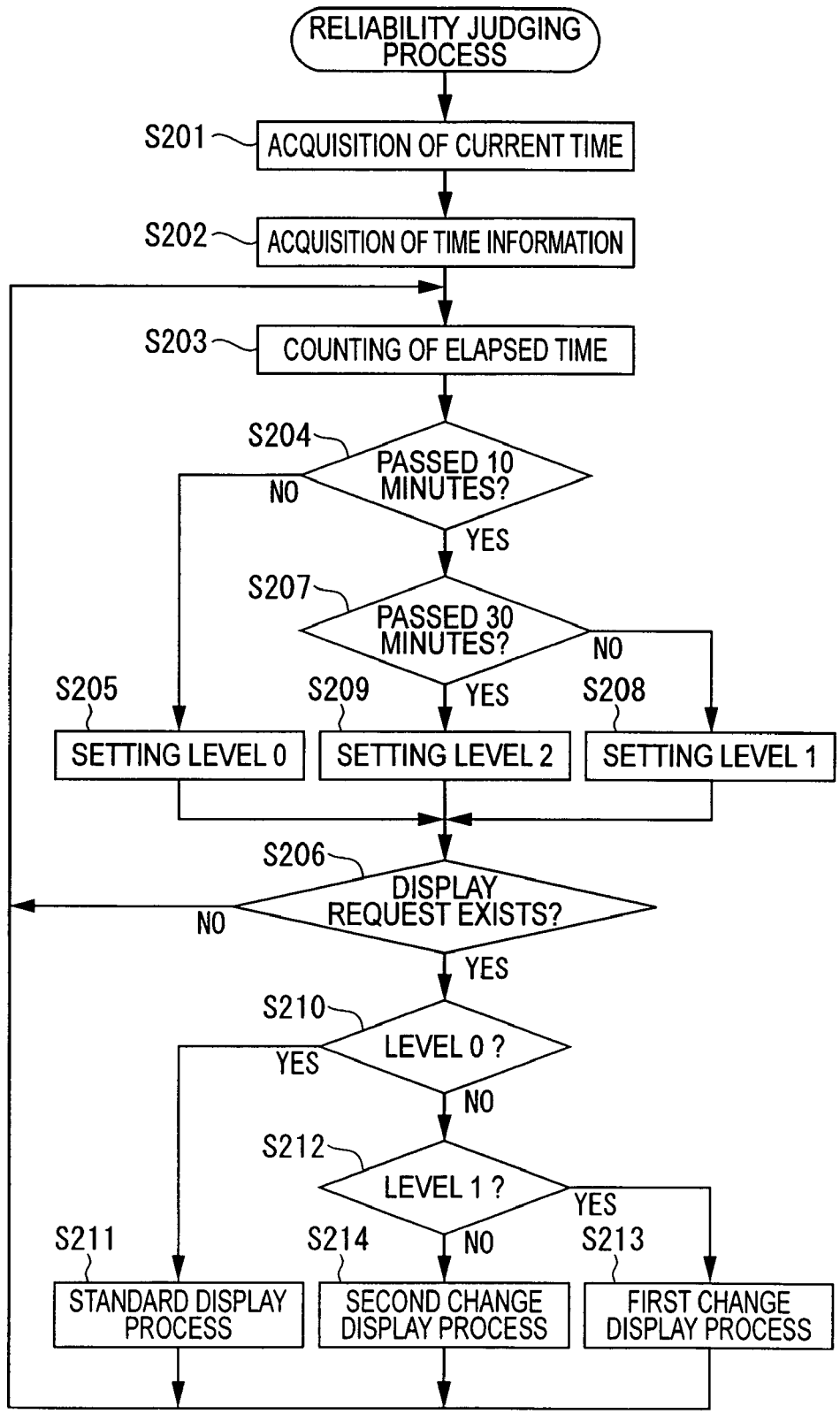
FIG. 13 is a flowchart showing an information reliability judging process according to the aforesaid embodiment.

When the occupant, who is the user on the vehicle, turns on the navigation device 100, electricity is supplied to the navigation device 100, so that the processor 180 controls the terminal display section 140 to display a main menu. Specifically, the terminal display section 140 displays the menu for prompting the user to input the settings for the navigation device 100. When the processor 180 recognizes an input operation for displaying the map information through the menu, the display controller 185 controls the terminal display section 140 to display the map information. Herein, the self position may be recognized and the icon indicating the self position may be superposed on the map information of a predetermined scale, which will be described later. When the electricity is supplied, the processor 180 conducts an information storing process for acquiring information in the communication unit 120 (FIG. 12) and a reliability judging process for judging information reliability (FIG. 13).

(Information Storing Process)

The process will be described in detail. On receiving the electricity, the processor 180 judges whether the communication unit 120 has acquired the map component information such as the traffic information 121 and the feature information 122, that is, the processor 180 is in a waiting state for acquiring the map component information (Step S101). When the communication unit 120 acquires the map component information, the processor 180 judges whether the map component information contains the time information 121C, 122C (Step S102). In Step S102, when the processor 180 judges that no time information 121C, 122C is contained, the current time counted by the timer 188 is acquired as the time information 121C, 122C (Step S103). Then, the processor 180 judges the type of the map component information to set the ID number 162A1 to this map component information (Step S104). On the other hand, in Step S102, when the processor 180 judges that the time information 121C, 122C is contained, the process proceeds to Step S104 to set the ID number 162A1.

Subsequently, the processor 180 generates the guidance 162A by associating the guidance 162A with the ID number 162A1 and the time information 121C, 122C based on the map component information. Specifically, when the guidance 162A contains plural pieces of traffic jam information 121A1 to 121Am or plural pieces of parking area information 122A1 to 122Am such as the traffic information 121 relating to traffic jams (FIG. 2) and the feature information 122 relating to parking areas (FIG. 3), the processor 180 generates plural pieces of guidance 162A as shown in FIG. 6 so as to separate the traffic jam information 121A1 to 121Am and the parking area information 122A1 to 122Am, each piece of guidance 162A being associated with the ID number 162A1 and the time information 121C, 122C to form a single record (Step S105).

The processor 180 controls the updating status recognizer 190 to judge whether the generated guidance 162A is identical with the already stored guidance 162A. Specifically, the updating status recognizer 190 retrieves, from the information storage region 162, the guidance 162A having the same ID number 162A1 as that of the guidance 162A generated in Step S105 (Step S106). The updating status recognizer 190 then judges whether the position information 121D, 122D of the retrieved guidance 162A is identical with that of the generated guidance 162A (Step S107). When it is not identical, the updating status recognizer 190 newly stores the generated guidance 162A in the information storage region 162 (Step S108). When it is identical, the process returns to Step S101 to wait for next acquisition of the map component information.

In Step S107, the guidance 162A that is judged to be identical is updated (Step S109). Further, the updating status recognizer 190 controls the timer 188 to count the time elapsed from the updating by comparing the current time based on the time information 121C, 122C of the updated guidance 162A. The updating status recognizer 190 judges whether the counted elapsed time from the updating has exceeded a predetermined time period (Step S110). In Step 110, when the elapsed time from the updating is judged to have exceeded the predetermined time period, the process returns to Step S101 to wait for next acquisition of the map component information. In Step 110, when the elapsed time from the updating is judged to be within the predetermined time period, it is judged whether a request for displaying the guidance 162A exists (Step S111). When no request for displaying the updated guidance 162A exists, the process returns to Step S110, where the elapsed time from the updating is kept counted. In Step S111, when it is judged that such request exists or the guidance 162A is already displayed, the processor 180 outputs a signal indicating that the predetermined guidance 162A has been updated to the display controller 185. Thereby, the display controller 185 conducts an updating change displaying process for displaying information in accordance with the updating, for example, in a flashing manner (Step S112). The process returns to Step S101 to wait for next acquisition of the map component information.

(Reliability Judging Process)

On receiving the electricity, the processor 180 conducts the reliability judging process as shown in FIG. 13. On receiving the electricity, the processor 180 acquires current time information relating to the current time counted by the timer 188 (Step S201). Subsequently, the processor 180 controls the timer 188 to acquire the time information 121C, 122C from each of the plural pieces of guidance 162A stored in the information storage region 162 (Step S202). The elapsed time judging unit 189 of the processor 180 controls the timer 188 to compare the acquired time information 121C, 122C with the current time in order to count the elapsed time from the time written in the time information 121C, 122C of the guidance 162A (Step S203). Further, the elapsed time judging unit 189 judges whether the elapsed time counted by the timer 188 has exceeded a predetermined time period set in advance.

For example, the elapsed time judging unit 189 judges whether ten minutes have elapsed (Step S204). In Step S204, when it is judged that ten minutes have not elapsed, the elapsed time judging unit 189 judges that the guidance 162A having such time information 121C, 122C is comparatively new and accordingly sets "Level 0" (Step S205). For example, the guidance 162A is associated with flag information relating to "Level 0". Subsequently, the elapsed time judging unit 189 judges whether the request for displaying the guidance 162A exists or not (Step S206).

On the other hand, in Step S204, when it is judged that ten minutes have elapsed, the elapsed time judging unit 189 judges whether thirty minutes have elapsed (Step S207). In Step S207, when it is judged that thirty minutes have not elapsed, the elapsed time judging unit 189 judges that the guidance 162A having such time information 121C, 122C is becoming old and the reliability of the guidance 162A has been degraded. Accordingly, the elapsed time judging unit 189 sets "Level 1" and associates the guidance 162A with flag information relating to "Level 1" (Step S208). Then, the process proceeds to Step S206. In Step S207, when it is judged that thirty minutes have elapsed, the elapsed time judging unit 189 judges that the guidance 162A having such time information 121C, 122C is comparatively old and the reliability of the guidance 162A has been degraded. Accordingly, the elapsed time judging unit 189 sets "Level 2" and associates the guidance 162A with flag information relating to "Level 2" (Step S208). Then, the process proceeds to Step S206.

In Step S206, when no request for displaying the predetermined guidance 162A exists, the process returns to Step S203, where the elapsed time is kept counted. In Step S206, when it is judged that the request for displaying the predetermined guidance 162A exists or the predetermined guidance 162A is already displayed, the elapsed time judging unit 189 judges the reliability of the guidance 162A. Specifically, the flag information associated to the guidance 162A is read and accordingly whether the flag information is "Level 0" is judged (Step S210). In Step S210, when it is judged that the flag information is "Level 0", that is, when it is judged that the elapsed time from the acquisition of the map component information is short and the reliability of the guidance 162A is accordingly high, the display controller 185 conducts a standard display process (Step S211). Specifically, the elapsed time judging unit 189 outputs to the display controller 185 a signal relating to information that identifies the guidance 162A associated with the "Level 0" flag information or a signal that relates to "Level 0" and contains the guidance 162A. On acquiring the signal relating to "Level 0", the display controller 185 acquires the image data relating to the icon A from the conversion table region of the storage 160 based on the ID number 162A1 of the guidance 162A. Further, the display controller 185 conducts the standard display process in which the position information 121D, 122D of the guidance 162A is recognized and the image data is superposed at a predetermined position on the map information based on the position information 121D, 122D so as to be displayed on the terminal display section 140. Subsequently, the process returns to Step S203 to continue the counting of the elapsed time.

In Step S210, when the flag information is judged not to be "Level 0", it is judged whether the read flag information is "Level 1" (Step S212). In Step S212, when the flag information is judged to be "Level 1", that is, when it is judged that the elapsed time from the acquisition of the map component information is comparatively long and the reliability thereof has been accordingly degraded, the display controller 185 conducts a first change display process (Step S213). Specifically, the elapsed time judging unit 189 outputs to the display controller 185 a signal relating to information that identifies the guidance 162A associated with the "Level 1" flag information or a signal that relates to "Level 1" and contains the guidance 162A. On acquiring the signal relating to "Level 1", the display controller 185 recognizes the icon information 163A1 and the change condition information 163A2 of the guidance 162A from the conversion table region 163 of the storage 160 based on the ID number 162A1 of the guidance 162A. Further, the display controller 185 acquires the image data relating to the icon A from the icon data region based on the icon information 163A1 and recognizes the position information 121D, 122D of the guidance 162A. The display controller 185 operates a calculation routine for the first change display process based on the change condition information 163A2 to change the display pattern of the image data to a first change status corresponding to "Level 1". Subsequently, the display controller 185 conducts the first change display process, where the icons A of which display pattern is changed to the first change status based on the recognized position information 121D, 122D are superposed at predetermined positions on the map information so as to be displayed on the terminal display section 140 like the icons A1 shown in dashed line in FIG. 10. Subsequently, the process returns to Step S203 to continue the counting of the elapsed time.

In Step S212, when the flag information is judged not to be "Level 1", the read flag information is accordingly judged to be "Level 2". Specifically, it is judged that a long period of time has elapsed from the acquisition of the map component information and the reliability thereof is low. Accordingly, the display controller 185 conducts a second change display process (Step S214). Specifically, similarly to the first change display process in Step S213, the display controller 185 acquires a signal relating to "Level 2" and to recognize the position information 121D, 122D of the guidance 162A, the image data of the icons A and the change condition information 163A2. A calculation routine for the second change display process is operated to conduct the second change display process in which the display pattern of the image data is changed to a second change status corresponding to "Level 2" and the image data is superposed on the map information. Subsequently, the process returns to Step S203 to continue the counting of the elapsed time.

(Travel Route Setting Process)

Figure 14:
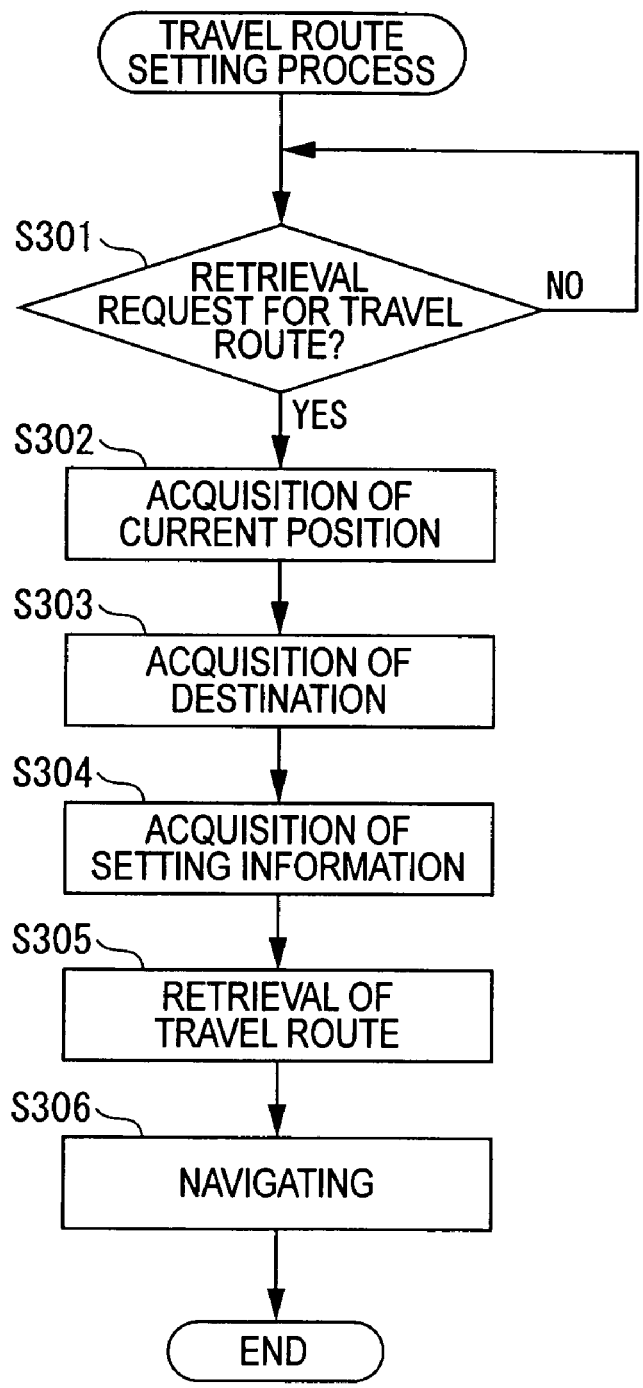
FIG. 14 is a flowchart showing a travel route retrieving process according to the aforesaid embodiment.

The user may input a setting from the main menu using the terminal input section 130. For example, the user may set a retrieval process for a travel route as shown in FIG. 14. When the processor 180 recognizes the setting for the retrieval process for the travel route (Step S301), the processor 180 controls the terminal display section 140 to display prompts for the user to input various kinds of information necessary for the retrieval of the travel route such as a destination and which is given a higher priority, the shortest distance or the shortest time.

When the processor 180 recognizes the information necessary for the travel route retrieval, which is input through the terminal input section 130, the current position recognizer 181 recognizes the current position (Step S302) and the destination recognizer 182 recognizes the input destination (Step S303). The processor 180 controls the terminal display section 140 to display prompts for the user to input conditions for the retrieval of the travel route. When the user inputs the settings with the terminal input section 130 following the displayed instructions, the processor 180 acquires setting information relating to the settings input by the user (Step S304). The acquired current position information, destination information and setting information are appropriately stored in the memory 170.

Subsequently, the processor 180 controls the route processor 187 to conduct a route retrieving process in which the travel route from the current position of the vehicle to the destination is retrieved by using the travel route retrieval map information and the matching data MM of the map information stored in the map information storage region 161 of the storage 160. The retrieval is conducted based on the current position information, the destination information and the setting information stored in the memory 170 and the traffic jam information 121A1 to 121Am stored in the information storage region 162.

The route processor 187 detects plural travel routes (for example, five travel routes) complying with the setting information, calculates each required time of the travel routes to the destination and generates required time information. When the display controller 185 recognizes that the route processor 187 has detected the travel routes and generated the required time information, the display controller 185 controls the terminal display section 140 to display the travel route information and the required time information on the travel routes together with a prompt for the user to select one travel route. Then, the travel route is set through the input operation of selecting one travel route information by the user.

In accordance with the setting of the travel route, the display controller 185 of the processor 180 acquires the map information of a predetermined scale from the map information storage region 161 and controls the terminal display section 140 to display icons of the set travel route and the current position on the map information. Note that when predetermined map component information (such as the traffic information 121 and the feature information 122) is set in advance to be displayed in a superposing manner, such map component information is superposed on the map information based on the ID number 162A1 of the guidance 162A of the map component information and the level in the above-described reliability judging process.

The processor 180 recognizes the travel status of the vehicle based on the data output from the speed sensor, the azimuth sensor and the acceleration sensor of the sensor unit 110 and the GPS data output from the GPS receiver. Based on the recognized travel status and the travel guidance contained in the travel route information on the travel route, the processor 180 controls the sound production controller 184 and the display controller 185 to aurally and visually navigate the user for the traveling of the vehicle (Step S306).

[Effects and Advantages of Navigation Device]

In the above-described embodiment, when the communication unit 120 acquires: the traffic jam information 121A1 to 121Am and the parking area information 122A1 to 122Am which form the map information containing at least either of the traffic information 121 on the traffic status or the feature information 122 on the feature; and the map component information containing the time information 121C, 122C relating to the time when the traffic jam information 121A1 to 121Am and the parking area information 122A1 to 122Am are generated and distributed, the timer 188 counts the elapsed time up to the current time based on the time information 121C, 122C. Accordingly, the icons A of the traffic jam information 121A1 to 121Am and the parking area information 122A1 to 122Am which contain the map component information on the elapsed time having exceeded the predetermined time period are displayed in a different manner from the icons A of the traffic jam information 121A1 to 121Am and the parking area information 122A1 to 122Am which contain the map component information on the elapsed time not having exceeded the predetermined time period. For example, some icons A are displayed differently like the icons A1 and A2. Although the reliability of the map component information of which elapsed time from generation has exceeded the predetermined time period is relatively low, the user can appropriately judge the reliability of the map component information, since such map component information is displayed in a different manner from the map component information of which elapsed time is within the predetermined time period (that is the map component information with relatively high reliability). In addition, by controlling display patterns, the user can be appropriately notified of necessary information. Hence, by using the aforesaid embodiment for the navigation device 100, the user can easily recognize necessary and reliable information for traveling. In other words, the user can be provided with an appropriate navigation for better traveling.

To provide the different display patterns, the display patterns of the corresponding icons A are changed in the image data. Hence, appropriate information can be notified to the user through such a simple process. Therefore, the arrangement can be simple, thereby easily improving the manufacturing efficiency while lowering the cost as well as easily improving the processing speed and the usability.

The traffic jam information 121A1 to 121Am and the parking area information 122A1 to 122Am are generated as the guidance 162A having a single data structure in which the time information 121C, 122C of the map component information is associated. Various processes are conducted using such guidance 162A. Accordingly, it is possible to notify the user of each reliability of the plural piece of information on the traffic status and the feature. Hence, the user can be notified of more appropriate and detail information.

The traffic jam information 121A1 to 121Am and the parking area information 122A1 to 122Am are associated with the time information 121C, 122C relating to the time of generation of the distributed map component information. The display pattern is changed by judging the elapsed time based on the time information 121C, 122C. Hence, it is possible to prevent degradation of the reliability due to time differences in acquiring information (for example, the information cannot be appropriately acquired due to communication error), thereby ensuring better notification of the more appropriate information.

Further, when the map component information contains no time information 121C, 122C, the traffic jam information 121A1 to 121Am and the parking area information 122A1 to 122Am are associated with the current time (as the time information 121C, 122C) counted by the timer 188 at a time point when the map component information is acquired. Hence, even in the case of the map component information containing no time information 121C, 122C to be used for judgment of the reliability, the reliability can be judged, thereby ensuring better notification of the more appropriate information.

The information storage region 162 of the storage 160 has a table structure storing plural pieces of guide information 162A each associated with the time information 121C, 122C. Hence, it is possible to collectively process the plural pieces of map component information of different type, thereby improving the processing efficiency and the usability.

In addition, the guidance 162A has a data structure in which the ID number 162A1 representing the type of the information is associated. Accordingly, it is possible to display the icons A in different manners depending on type, thereby improving the viewability to ensure more effective visual notification of the information. Since the change condition information 163A2 is set for each type as described above, each type can be set with a different change status for changing the display pattern. Therefore, the reliability of each type can be clearly notified, thereby ensuring more appropriate notification.

When the map component information same as the acquired map component information is already stored, the acquired map component information is updated. Hence, the map component information can be appropriately administrated, thereby easily notifying up-to-date information. Further, the update is judged based on the ID number and the position information. Hence, it is possible to easily and speedily judge whether the information is to be updated even for the guidance 162A of a simple structure. When the map component information has been updated, it is possible to easily notify such up-to-date information by displaying the updated map component information in a different display pattern from other map component information, thereby ensuring more appropriate notification of the information. When a certain period of time has elapsed from the update, the information is no longer new, so that, for example, the standard display process is conducted. Accordingly, an indication representing that the information has been updated is not unnecessarily displayed for a long time, thereby preventing degradation in the viewability while ensuring more appropriate notification of the update.

The icons are controlled such the display pattern is changed to be more apparent as the elapsed time becomes longer. Specifically, the transparency of the icon becomes higher in 30 minutes than in 10 minutes due to threshold values, so that the icons become less visible to the user. Hence, degree of the reliability can be easily notified, thereby ensuring more appropriate notification of the information.

[Modifications of Embodiments]

The present invention is not limited to the above specific embodiment, but includes modifications and improvements as long as an object of the present invention can be attained.

The mobile body is not limited to a vehicle, but includes any mobile body such as an airplane or a ship. The user oneself may be the mobile body if the current position of the user carrying the terminal unit is recognized as the current position of the terminal unit. Additionally, as mentioned earlier, a mobile phone or a PHS (Personal Handyphone System) may be used as the terminal unit that can be carried directly by the user, while the base station of the mobile phone or the PHS may be used as the server. With this arrangement, the mobile phone or the PHS may acquire information from the base station.

While the functions are realized in the form of programs in the above description, the functions may be realized in any form including hardware such as a circuit board, elements such as an IC (Integrated Circuit) or a separate network of the programs. In view of easy handling and promotion of the use, the functions are preferably stored and read from programs or storage media to be utilized in the above described arrangement.

Although the arrangement in which the travel route is to be set for the navigation is described above, another arrangement may be employed, in which the map information is simply displayed on the display device for the use. For example, as described above, the arrangement may be used for displaying the map information, in which the personal computer may read the program and receive the map component information distributed via the network and the display patterns of the icons on the map information are appropriately changed by controlling the elapsed time. 訳なし

Although the navigation device 100 which establishes the navigation function by itself by displaying the map information stored in the navigation device 100 is described above, a system configuration may be employed, which includes a map storage for storing the map information, a server having a guidance generator for receiving the map component information and generating guidance, and an in-vehicle terminal unit for receiving the guidance via the network. In such system configuration, the server can uniformly manage the map component information, generation of the guidance 162A and the elapsed time, thereby decreasing burden in processing on the terminal unit, simplifying the structure of the terminal unit, improving the manufacturing efficiency and decreasing the cost. In the on-mobile-body arrangement, even when the map component information cannot be acquired due to the travel status, managing the elapsed time by the server allows uniform management of the reliability of the information. When the terminal unit becomes able to receive the map component information, the reliability of the information can be acquired at that time. Therefore, more appropriate information can be notified.

The network may be the Internet based on a general-purpose protocol such as TCP/IP protocol, an intranet, a LAN (Local Area Network), a communication network and a broadcasting network that have a plurality of base stations that can send/receive information by way of a radio medium, or the radio medium itself that realizes direct information transmission between the terminal unit and the server. The radio medium may be any one of electric waves, light beams, acoustic waves and electromagnetic waves.

As the map component information received by the communication unit 120, the traffic information 121 having a single data structure containing the plural pieces of traffic jam information 121A1 to 121Am and the feature information 122 having a single data structure containing the plural pieces of parking area information 122A1 to 122Am are described above. However, the traffic information 121 and the feature information 122 may contain only one piece of traffic jam information 121A1 to 121Am or one piece of parking area information 122A1 to 122Am which is associated with the time information 121C, 122C. In this case, the guidance 162A may be generated by associating the ID number 162A1 to the map component information with the guidance generator 183. In addition, the map component information may be one piece of traffic jam information 121A1 to 121Am or one piece of parking area information 122A1 to 122Am which is not associated with the time information 121C, 122C. In this case, as exemplified in the above-explained Step S103, the guidance 162A may be generated as one record by assigning the ID number 162A1 to the map component information by the guidance generator 183 and by assigning the time counted by the timer 188 at the time when the map component information is received as the time information 121C, 122C. Further, the map component information may not be limited to the information relating to traffic jams and parking areas but include any type of information relating to the traffic status and the feature (such as information on traffic controls and crowding status of a service area or a parking) which is necessary for traveling the vehicle.

The feature information 122 may relate to a mobile object such as a vehicle of an acquaintance. In this case, the position information 121D, 122D of the vehicle of the acquaintance may be acquired via the server and the display pattern of the icon representing the vehicle of the acquaintance may be changed depending on the elapsed time from the acquisition of the position information 121D, 122D. In addition to acquiring the position information of the vehicle of the acquaintance, a sequential number of the vehicle may be used.

The image data of the icon A to be displayed as the map component information may be associated. Further, the change condition information 163A2 may be associated.

In addition, concrete structures and procedures in embodying the present invention can be changed to different structures and others as long as an object of the invention can be achieved.

[Advantages of Embodiments]

As describe above, when the following is acquired: the traffic jam information 121A1 to 121Am and the parking area information 122A1 to 122Am which form the map information containing at least either of the traffic information 121 on the traffic status or the feature information 122 on the feature; and the map component information containing the time information 121C, 122C relating to the time when the traffic jam information 121A1 to 121Am and the parking area information 122A1 to 122Am are generated and distributed, the elapsed time up to the current time is counted based on the time information 121C, 122C. Accordingly, the icons A of the traffic jam information 121A1 to 121Am and the parking area information 122A1 to 122Am which contain the map component information on the elapsed time having exceeded the predetermined time period are displayed in a different manner from the icons A of the traffic jam information 121A1 to 121Am and the parking area information 122A1 to 122Am which contain the map component information on the elapsed time not having exceeded the predetermined time period. For example, some icons A are displayed differently like the icons A1 and A2. Hence, although the reliability of the map component information of which elapsed time from generation has exceeded the predetermined time period is relatively low, the user can appropriately judge the reliability of the map component information, since such map component information is displayed in a different manner from the map component information of which elapsed time is within the predetermined time period (that is the map component information with high reliability). Thereby, the information can be appropriately notified.

When the traffic jam information 121A1 to 121Am and the parking area information 122A1 to 122Am which form the map information containing at least either of the traffic information 121 on the traffic status or the feature information 122 on the feature is acquired, the elapsed time up to the current time is counted based on the time information at the acquisition time, and the icons A of the traffic jam information 121A1 to 121Am and the parking area information 122A1 to 122Am which contain the map component information on the elapsed time having exceeded the predetermined time period are displayed in a different manner from the icons A of the traffic jam information 121A1 to 121Am and the parking area information 122A1 to 122Am which contain the map component information on the elapsed time not having exceeded the predetermined time period. For example, some icons A are displayed differently like the icons A1 and A2. Hence, although the reliability of the map component information of which elapsed time from generation has exceeded the predetermined time period is relatively low, the user can appropriately judge the reliability of the map component information, since such map component information is displayed in a different manner from the map component information of which elapsed time is within the predetermined time period (that is the map component information with high reliability). Thereby, the information can be appropriately notified.

INDUSTRIAL APPLICABILITY

Aspects of the present invention can be applied to a map information display control device, a system thereof, a method thereof, a program thereof and a recording medium storing the program.

The invention claimed is:

1. A map information display control device, comprising:
an acquirer which acquires traffic information;
a display that displays information;
a display controller that displays the traffic information on the display together with map information; and
a timer that counts an elapsed time from a time at which the traffic information is acquired to a current time; wherein
the traffic information includes congestion-related information comprising:
a display component that represents a position of a traffic jam;
a display component that represents a congestion level; and
a display component that represents a temporal change after receiving the traffic information, and
when the elapsed time exceeds a first predetermined time period, the display controller displays the display component that represents the temporal change in a first format different from a previous format of the display component that represents the temporal change before the elapsed time exceeds the first predetermined time period while keeping a display format of the display component that represents the position of the traffic jam and the display component that represents the congestion level.

2. The map information display control device according to claim 1, wherein
when the elapsed time counted by the timer exceeds a second predetermined time period longer than the first predetermined time period, the display controller displays the display component that represents the temporal change in a second format different from the first format displayed when the elapsed time exceeds the first predetermined time.

3. A map information display control method implemented by a map information display control device, the method comprising:
acquiring traffic information; and
controllably displaying the traffic information on a display together with map information;
timing an elapsed time from a time at which the traffic information is acquired to a current time, wherein
the traffic information includes congestion-related information comprising:
a display component that represents a position of a traffic jam;
a display component that represents a congestion level; and
a display component that represents a temporal change after receiving the traffic information, and
in the displaying, when the elapsed time exceeds a first predetermined time period, the display component that represents the temporal change is displayed in a first format different from a previous format of the display component that represents the temporal change before the elapsed time exceeds the first predetermined time period while keeping a display format of the display component that represents the position of the traffic jam and the display component that represents the congestion level.

* * * * *